(12) United States Patent
Care et al.

(10) Patent No.: US 8,739,611 B2
(45) Date of Patent: Jun. 3, 2014

(54) STRAIN INDICATOR FOR A GAS TURBINE ENGINE COMPONENT

(75) Inventors: Ian C. D. Care, Derby (GB); Ewan F. Thompson, Derby (GB)

(73) Assignee: Rolls-Royce PLC, London (GB)

( * ) Notice: Subject to any disclaimer, the term of this patent is extended or adjusted under 35 U.S.C. 154(b) by 235 days.

(21) Appl. No.: 13/208,938

(22) Filed: Aug. 12, 2011

(65) Prior Publication Data
US 2012/0060594 A1 Mar. 15, 2012

(30) Foreign Application Priority Data
Sep. 15, 2010 (GB) .................................. 1015336.9

(51) Int. Cl.
*G01M 15/14* (2006.01)

(52) U.S. Cl.
USPC ...................................................... 73/112.01

(58) Field of Classification Search
USPC ......................................... 73/112.01, 112.03
See application file for complete search history.

(56) References Cited

U.S. PATENT DOCUMENTS

| | | | |
|---|---|---|---|
| 5,275,536 A | 1/1994 | Stephens et al. | |
| 6,499,350 B1 * | 12/2002 | Board et al. | 73/660 |
| 6,932,560 B2 * | 8/2005 | Brooks | 415/1 |
| 7,555,951 B2 * | 7/2009 | Shadman et al. | 73/579 |
| 7,647,809 B1 | 1/2010 | Cooney | |
| 8,006,544 B2 * | 8/2011 | Holmes et al. | 73/112.01 |
| 8,413,493 B1 * | 4/2013 | Polywoda, III | 73/112.01 |
| 2008/0223152 A1 | 9/2008 | Georgeson et al. | |

FOREIGN PATENT DOCUMENTS

| | | |
|---|---|---|
| EP | 1 099 389 A1 | 5/2001 |
| GB | 2 403 987 | 1/2005 |
| WO | WO 2005/034666 A1 | 4/2005 |

OTHER PUBLICATIONS

Search Report issued in British Application No. GB1015336.9 dated Jan. 11, 2011.

* cited by examiner

*Primary Examiner* — Eric S McCall
(74) *Attorney, Agent, or Firm* — Oliff PLC

(57) ABSTRACT

A component for use in a gas turbine engine comprises an indicator operable to provide a visual indication when strain over a threshold value has been experienced by the component by transitioning from a rest state to an indication state on occurrence of strain above the threshold value. Also disclosed is a method of detecting foreign object damage in a component of a gas turbine engine, comprising: identifying at least one of a component or a region of a component that is subject to increased strain during a foreign object impact; and mounting an indicator on the identified component or region of a component, the indicator providing a visual indication when increased strain has been experienced.

19 Claims, 4 Drawing Sheets

STRAIN INDICATOR FOR A GAS TURBINE ENGINE COMPONENT

The present invention relates to a gas turbine engine component and particularly to a critical component such as a fan, compressor blade or nose cone when such a component is made from composite material. The invention also relates to a method of detecting foreign object damage to such a component.

BACKGROUND

Elements of a gas turbine engine are subject to damage when impact of a foreign object takes place during operation of the engine. This may for example be a bird strike or other impact. Fan blades, nose cones (spinners) and compressor aerofoils are particularly susceptible to this type of foreign object damage (FOD). Larger impacts, such as bird strikes, are particularly dangerous and can cause structural damage to the engine. In the design of engines for aircraft, components of a gas turbine engine whose failure is likely to impair the aircraft's ability to continue safe flight are referred to as critical components, and special controls are necessary in the design and operation of such components to guard against their failure. In order to ensure the safe functioning of an engine, it is necessary either to design critical components to be able to resist such impacts, or to detect that impacts have occurred and to take the necessary corrective action before component fatigue causes complete failure of the component.

Designing components to be able to resist significant impact events, and then to have the integrity to continue in safe operation until the next scheduled maintenance, tends to result in their being significantly thicker and heavier than they would otherwise need to be. This has associated disadvantages for the engine as a whole, not least in terms of fuel consumption. However, if components are not to be designed to have such structural resistance, then detection of impact events must be extremely reliable, as such detection will be essential to the safety and integrity of the engine. Without the inherent ability to continue functioning until scheduled maintenance, a damaged component must be detected and corrective action taken at the earliest possible opportunity.

Visual inspection of gas turbine engine blades is hampered by the location of the engine on an aircraft. Fan blades are normally of greatest concern for FOD and while they are visible in most applications, they are also located some distance off the ground, meaning that a detailed inspection is not feasible during normal operational service. Detailed inspection is essential as FOD may not be obvious, or even visible, from a surface inspection. In metallic blades, cupping or minor cracking may occur following a bird strike. Composite blades are likely to show less distortion but may delaminate or suffer other internal damage, which is not easily detectable visually.

SUMMARY OF INVENTION

According to a first aspect of the present invention, there is provided a component for use in a gas turbine engine, the component comprising an indicator operable to provide a visual indication when strain over a threshold value has been experienced by the component by transitioning from a rest state to an indication state on occurrence of strain above the threshold value.

In providing a visual indication of the occurrence of high strain, the indicator highlights when conditions have occurred that could lead to internal or non-obvious structural damage to the component. The component of the present invention can thus be simply visually inspected for an indication that strains over a threshold level, such as those associated with foreign object impact, have occurred. Such a visual inspection can be conducted on a very regular basis, ensuring that blades which have been subject to an impact can be quickly and reliably identified, and the necessary action taken. With a reliable system of impact detection incorporated within the blade, the blade need not be made sufficiently thick and heavy to continue functioning after impact until the next scheduled maintenance.

The visual indication may comprise a change in colour of the indicator between the rest and indication states. For example, the indicator may take on a bright or fluorescent colour when in the indication state, so as to be easily distinguishable against the background of the component. The change of colour may be visible only against filtered light, so as to be easily identifiable to an operator with the correct light source or filter but not visible under normal ambient light.

The indicator may be operable to transition through a plurality of indication states on occurrence of strain over successive threshold values. In this manner, the indicator may provide a graded indication as to the level of strain experienced by the component, and hence the potential level of damage sustained by the component. This may for example assist with determining whether urgent detailed examination is required or whether the engine of which the component is a part may be safely run until the next scheduled maintenance. Some or all of the indication states may be visible only under certain light conditions.

The indicator may comprise an indication element and a fixation element. The transition mechanism of the indicator from rest to indication states may comprise failure of at least one of the indication element or the fixation element.

Transitioning via failure of a component part of the indicator assists in ensuring that once the indicator has transitioned to the indication state, it cannot return to the rest state when the high strain conditions that caused the transition are removed. The blade will still indicate that high strain has taken place no matter how much time has passed since the strain conditions returned below the threshold value.

The indication element may comprise a patch of frangible material. For the purposes of this specification, a patch refers to a piece or section of material that may be distinct from the material around it or to which it is attached. The patch of frangible material may be received on the surface of the component or may be inserted into the surface of the component. The patch and surrounding component surface may be shaped so as to minimise degradation of the aerodynamic performance of the component.

The frangible material of the patch may be operable to fail on application of strain above the threshold value. Failure of the patch thus constitutes the failure of the indication element that transitions the indicator from the rest to the indication state.

The frangible material may comprise a colour that is indicative of the indication state. For example, the frangible material may be through thickness dyed or otherwise coloured such that, on failure of the material for example by brittle shattering, the colour of the material becomes readily visible.

The patch of frangible material may house at least one frangible container which may hold a dye of a colour that is indicative of the indication state. The dye may comprise a liquid or a powder or other substance operable to stain that with which it comes into contact.

An outer surface of the indication element may comprise a coating of a colour that is indicative of the rest state. This colour may for example be the same colour as the rest of the component. In this manner, the indicator is not easily visually distinguishable from the rest of the component when in the rest state and only becomes visually distinguished when it transitions to the indication state. The coating may comprise a layer of paint or dye.

The fixation element may comprise a frangible adhesive. The frangible adhesive may be operable to fail on application of strain above the threshold value. Failure of the adhesive thus constitutes the failure of the fixation element that transitions the indicator from the rest to the indication state.

The frangible adhesive may comprise a colour that is indicative of the indication state. In this manner, when the adhesive fails and the indication element is released, the colour of the adhesive is revealed, demonstrating that the indicator is in the indication state.

The fixation element may comprise a frangible mechanical fastening, such as a bracket, pin or other appropriate device.

The fixation element may comprise a housing formed within the component. The housing may be operable to release the indication element on experiencing strain above the threshold value.

Release of the indication element may be effected by means of differential stiffness between the housing and the rest of the component, and/or the housing and the indication element. Alternatively, the scarf angles of the housing may be selected so as to release the indication element on application of strain over the threshold value.

The indication element may comprise a colour that is indicative of the rest state.

A region of the component that is covered by the indication element may comprise a colour that is indicative of the indication state. In this manner, when the indication element is released, the region of the blade that is covered by it is revealed and the colour of that region demonstrates that the indicator is in the indication state. According to this embodiment, at least a portion of the indicator is thus integrally formed with the component.

The component may be a blade or a stationary vane or an intake nacelle or a nose cone.

The indicator may be located at a region of the component that is subject to strain over the threshold value during an impact event. If the component is a blade or stationary vane, such regions may include the trailing edge tip and/or the blade root.

The blade may for example be a fan blade or a compressor aerofoil. The blade may be a component part of a blisk or bling. The blade may be of metallic or composite construction.

According to another aspect of the present invention, there is provided a method of detecting foreign object damage in a component of a gas turbine engine, comprising: identifying at least one of a component or a region of a component that is subject to increased strain during a foreign object impact, and mounting an indicator on the identified component or region of a component, the indicator providing a visual indication when increased strain has been experienced.

The indicator may comprise features as set out in relation to the component of the first aspect of the present invention.

According to another aspect of the present invention, there is provided an indicator for a component, the indicator comprising an indication element and a fixation element and being operable to transition from a rest state to an indication state on occurrence of strain above a threshold value, the transition mechanism from rest state to indication state comprising failure of at least one of the indication element or the fixation element.

Transition from rest to indication states may comprise a change in colour of the indicator.

The indicator may comprise additional features as set out in relation to the component of the first aspect of the present invention. The indicator may be applied to a component of a gas turbine engine or to any other component where it is desirable to indicate the occurrence of high levels of strain. Such components may for example include ducted fans, open rotors, wind turbines and propellers.

BRIEF DESCRIPTION OF THE DRAWINGS

For a better understanding of the present invention, and to show more clearly how it may be carried into effect, reference will now be made, by way of example, to the following drawings, in which:

FIG. 5 is a representation of an indication element on a nose cone.

DETAILED DESCRIPTION OF EMBODIMENTS

Embodiments of the present invention include component parts of a gas turbine engine, such as fan and compressor blades, stators, nose cones (spinners), cowlings and casings. Blades may, for example, be fan or compressor blades and may comprise component parts of a blisk or bling. In the following detailed description, the invention is disclosed with reference to a fan blade of a gas turbine engine, but it will be appreciated that the features discussed may equally be applied to any other component suitable for use within a gas turbine engine, and will be particularly applicable to critical components, especially those formed of composite materials.

A fan blade according to the present invention comprises an indicator that is operable to provide a visual indication when strain over a threshold value has been experienced by the blade. The visual indication of high strain is provided by the indicator transitioning from a rest state to an indication state on occurrence of strain above the threshold value. The indicator comprises an indication element and a fixation element, various embodiments of which are described below.

Figure 1A:
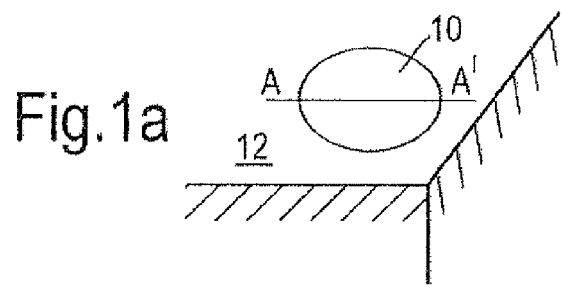
FIG. 1a is a representation of an indication element on a component.
Figure 1B:
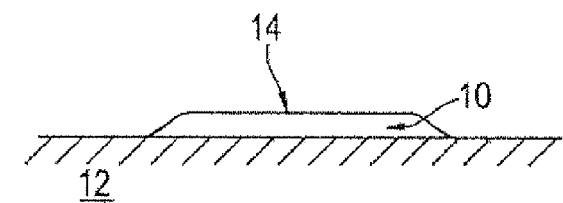
FIG. 1b is a cross section on the line AA' of FIG. 1a, illustrating the indication element mounted on a component surface.
Figure 1C:
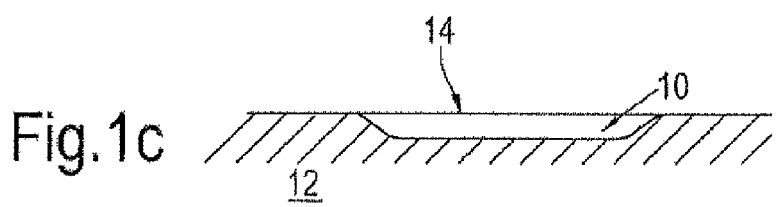
FIG. 1c is a cross section on the line AA' of FIG. 1a, illustrating the indication element mounted in a recess on a component surface.

According to a first embodiment of the invention, and with reference to FIG. 1, the indication element 10 of the indicator comprises a patch 10 of frangible material that is mounted on the pressure surface of the fan blade 12 as shown in FIG. 1b. The patch is mounted via the fixation element which may comprise an adhesive or some form of mechanical connection or chemical bond. The patch is of a suitable size to be visible against the fan blade in which it is incorporated; for example, the patch may be a planar element approximately 100×100 mm square or 100 mm in diameter. The patch and the adjacent region of the fan blade are shaped so as to minimize any degradation of the aerodynamic performance of the blade. This is accomplished for example by making the patch very thin, and by recessing the surface of the blade, such that the patch is flush with the aerodynamic profile of the blade, as illustrated in FIG. 1c.

The frangible material of the patch is selected to fail at strains immediately exceeding the selected threshold value of strain. The material may be engineered to ensure failure at the desired value of strain. The frangible material is a highly brittle material such as a ceramic or a glass, operable substantially to shatter at strains above the threshold value. The outer surface 14 of the patch of frangible material presents a surface that is visually indicative of a normal, or rest state of the indicator. According to one embodiment, this is achieved by painting, dying or otherwise colouring the outer surface 14 of the patch to be the same colour as the rest of the blade. In its normal, or rest state, the patch thus blends in with the rest of the blade, and is not easily visually distinguishable from the rest of the blade. On failure, the outer surface of the patch shatters to reveal the interior of the frangible material of the patch. The interior of the patch presents a surface which is visually very different from the outer surface of the patch and which is indicative of an indication state of the indicator. In one embodiment, this visual difference is achieved by dying or otherwise colouring the frangible material of the patch a bright or fluorescent colour throughout its thickness. This bright colour is revealed when the outer surface shatters in material failure, causing a dramatic change in appearance of the indicator. The distinctive colour of the interior of the frangible material is easily identifiable against the background of the blade on a visual inspection of the blade. The bright colour signifies that the indicator has transitioned to the indication state, and hence that an impact event involving strains over the threshold value has taken place.

Optionally, the frangible material of the patch may be coloured with a dye that is highly distinctive but only visible under certain light conditions. For example the frangible material may be coloured with UV paint, only visible under UV filtered light. The state of the indicator is thus not visible under normal ambient light conditions, and would remain hidden from a general observer, such as an aircraft passenger. However, to a technician conducting a visual inspection with the assistance of a UV light source, an indicator that had transitioned to the indication state would be immediately obvious.

According to another embodiment of the invention, brittle containers are encapsulated within the patch of frangible material. These containers may for example be hollow glass tubes. The brittle containers encapsulate within them a dye, which may be in liquid or powder form and which is released when the frangible material of the patch fails, shattering the brittle containers. The dye is of a bright colour and may be fluorescent. On release, the dye stains the adjacent material of the patch and surrounding blade, providing an easily identifiable visual signal that the indicator has transitioned to an indication state. As in the previous embodiment, the dye may be such as to be visible only under certain specific light conditions.

According to another alternative embodiment of the invention, the indication element 10 comprises a patch of material of low ductility, such as a metallic or ceramic material. The fixation element via which the patch is connected to the rest of the blade comprises a low ductility, frangible adhesive, such as a ceramic cement. The cement is selected to fail at strains immediately exceeding the selected threshold value of strain. The cement may be engineered to ensure failure at the desired value of strain. On occurrence of the threshold value of strain, the cement fails, releasing the patch and revealing a cement adhesive surface. Thus, the outer surface 14 of the patch is indicative of the normal or rest state of the indicator, and the broken cement surface, revealed on failure, is indicative of the indication state of the indicator. The cement adhesive surface is visually very different from the outer surface presented by the patch. According to a preferred embodiment, the visual difference between the patch and cement adhesive surfaces is achieved by colour. The patch, or at least the outer surface 14 of the patch, is of the same colour as the rest of the blade, so as to blend in with the rest of the blade. The cement adhesive is a bright or fluorescent colour that is easily distinguished from the rest of the blade. As described above, this bright or fluorescent colour may be visible only under certain light conditions or filters. In this manner the state of the indicator is readily visible to an operator with the correct equipment, but not visible to anyone else.

According to a further embodiment of the present invention, the indication element 10 comprises a patch of low ductility material, and the fixation element comprises a frangible mechanical element, such as a series of brackets, pins or other connectors. The connectors are selected to fail at strains immediately exceeding the selected threshold value of strain, and may be engineered to ensure failure at the desired value of strain. On occurrence of the threshold value of strain, the mechanical connectors fail, releasing the patch and revealing a portion of the blade surface that was concealed beneath the patch. Thus, the outer surface 14 of the patch is indicative of the normal or rest state of the indicator, and the covered blade surface, revealed on failure, is indicative of the indication state of the indicator. In this manner, a portion of the blade surface forms an integral part of the indicator. The covered blade surface is visually very different from the outer surface presented by the patch and according to a preferred embodiment, this visual difference is achieved using colour. As described above with reference to other embodiments, the patch, or at least the outer surface 14 of the patch, is of the same colour as the rest of the blade, so as to blend in with the rest of the blade. The covered blade surface underneath the patch is painted or dyed a bright or fluorescent colour that is be easily distinguished from the rest of the blade. Again, as described above, this bright or fluorescent colour may only be visible under certain light conditions or filters.

Figure 2A:
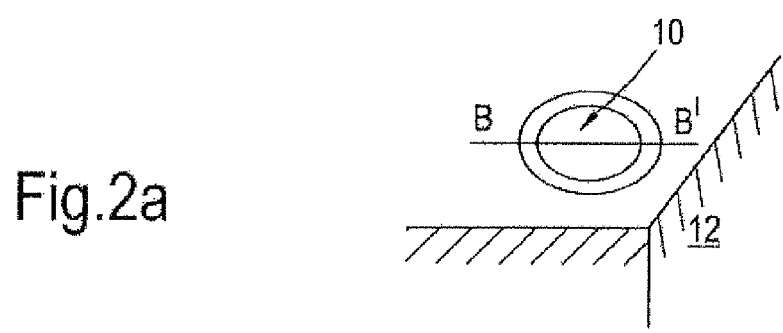
FIG. 2a is a representation of a multi stage indication element on a component.
Figure 2B:
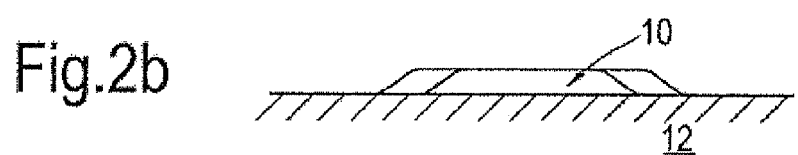
FIG. 2b is a cross section on the line BB' of FIG. 2a, illustrating the indication element mounted on a component surface.
Figure 2C:
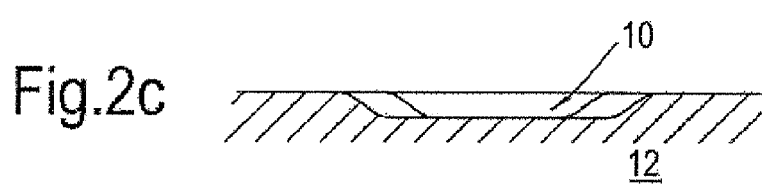
FIG. 2c is a cross section on the line BB' of FIG. 2a, illustrating the indication element mounted in a recess on a component surface.
Figure 3:
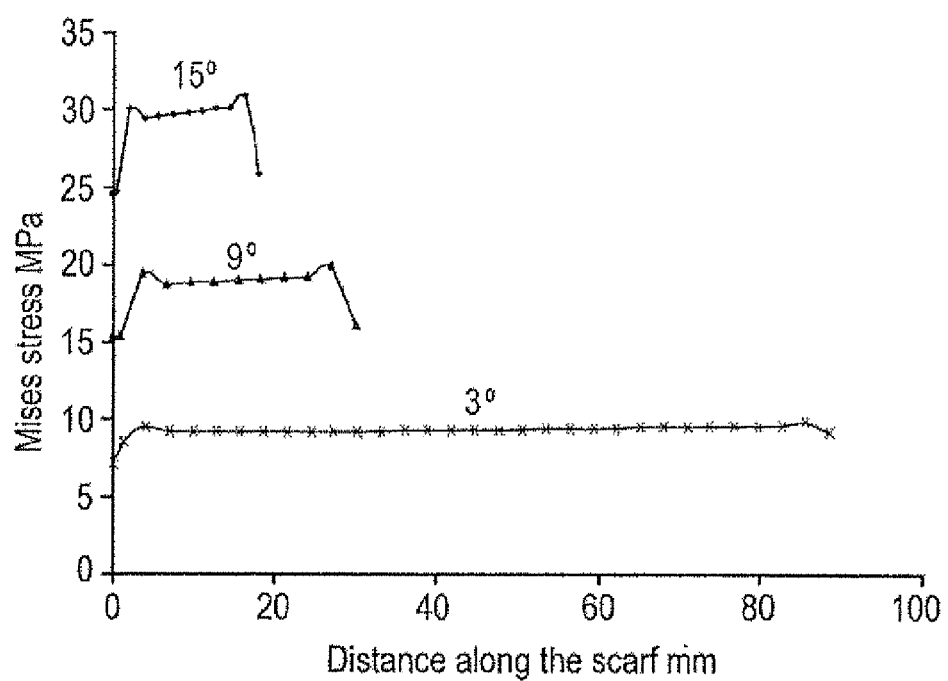
FIG. 3 is a von Mises graph for a scarf joint.

According to another embodiment of the present invention, the indication element 10 comprises a patch of material and the fixation element comprises a housing formed within the surface of the blade 12. As in the embodiment discussed immediately above, the outer surface 14 of the patch is indicative of the normal or rest state of the indicator, and the covered blade surface, contained within the housing, is indicative of the indication state of the indicator. The scarf angles of the housing, and/or the relative stiffness of the materials concerned, are selected such that on occurrence of strain above the threshold value the patch is released, revealing the blade surface beneath the patch and transitioning the indicator from the rest state to the indication state. As indicated in the von Mises graph of FIG. 3, strain peaks at the ends of a scarf joint and the angle can be chosen to provide this revealing effect even with the use of a similar material to the base material of the blade. According to a preferred embodiment, the patch, or at least the outer surface 14 of the patch, is of the same colour as the rest of the blade, so as to blend in with the rest of the blade. The covered blade surface underneath the patch is painted or dyed a bright or fluorescent colour that is easily distinguished from the rest of the blade. The release of the patch may be a multi stage process, for example as illustrated in FIG. 2, where an outer ring, corresponding to a first indication state is revealed at a first threshold value of strain, and an inner ring corresponding to a second indication state is revealed at a second threshold value of strain. The second threshold value may be higher or lower than the first threshold value. In the case of a multi stage indicator, some or all of the indication states may be visible only under specific light conditions, such as UV filtered light. In this embodiment, the interface between the indication element 10 and the fixation element may be selected to determine the threshold value at which the patch is released. This allows the patch to be made of similar material to the blade, which aids non-destructive examination of the component.

For all embodiments of the invention, the threshold value is selected to be indicative of a level of strain associated with a significant impact event such as a large bird strike. Strain above the threshold value is thus associated with a level of stress that could be sufficient to cause damage to the blade, although this damage may be visible or non-visible. The strain experienced by a fan blade during an impact event varies with location on the blade and the threshold value is therefore selected according to the particular properties of the blade concerned and the location at which the indicator is incorporated into the blade.

Figure 4:
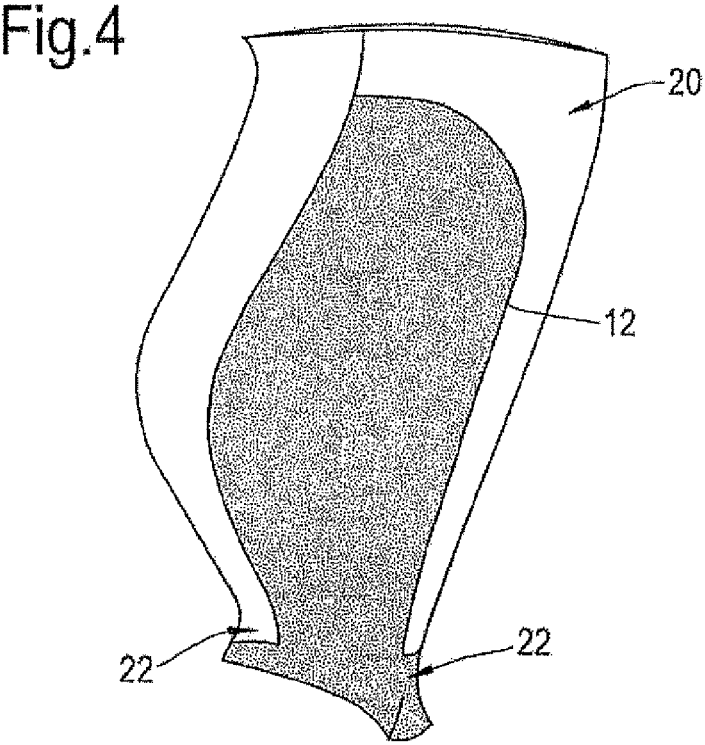
FIG. 4 is a representation of a blade.

According to preferred embodiments, the indicator is located in a region of the blade that experiences very high ratios of normal to impact strain during an impact event. The trailing edge tip region is an example of one region in which disproportionately high strains are experienced during an impact event and is thus an appropriate location for the indicator. The blade root also experiences very high loads during an impact event and is thus also an appropriate location for the indicator. FIG. 4 shows a composite blade 12 and illustrates locations at the trailing edge tip 20 and at the root 22 at which an indicator may be incorporated according to the present invention.

In use, an indicator is incorporated into a blade in accordance with the invention. The indicator remains in place in the rest state throughout normal use of the blade as a component part of a gas turbine engine, for example on an aircraft. Regular visual inspections of the blade are conducted as part of routine walk around engine and aircraft checks. If the indication state of the indicator incorporated into the blade is only visible under certain light conditions, the inspections are carried out with the assistance of an appropriate light source or filter. While the indicator remains in the rest state, the indicator is substantially indistinguishable from the rest of the blade, providing a visual confirmation that the blade is functioning normally. In the event of a bird strike or other significant impact event, the indicator transitions from the rest state to the indication state. This transition may take the form of brittle failure of the indication element or of the fixation element as discussed above. Once transitioned to the indication state, the indicator provides a clearly identifiable visual signal that an impact event has taken place involving strains above the threshold value. This signal can be easily detected during the next routine visual walk around inspection of the engine. On noting a blade having a indicator in the indication state, appropriate action can be taken to subject the blade to further scrutiny and testing to determine whether or not significant damage has taken place. If the indicator is of the graded variety discussed above, the appropriate action may first include determining to what extent the indicator has failed, meaning which indication state has it transitioned to. This may provide sufficient information to determine if immediate further action is required, or if limited additional running may be allowed before a detailed inspection is carried out.

It will be appreciated that once the indicator incorporated into the blade has transitioned to the indication state, the indicator remains in the indication state even after the high strain conditions that caused the transition have ceased. The present invention thus ensures that the occurrence of high strain conditions associated with an impact event is indicated, no matter what the time delay between occurrence of the high strain event and the next inspection.

It will also be appreciated that the nature of the strain experienced by the indicator will depend upon the position on the blade at which the indicator is located. For example, conditions at the trailing edge tip of the blade, indicated at 20 on FIG. 4, are very different to those at the root of the blade, indicated at 22 in FIG. 4. Conditions at the root of the blade will result in failure of either the indication element or the fixation element by crushing, in contrast to the tensile forces experienced at the trailing edge tip.

Figure 5A:
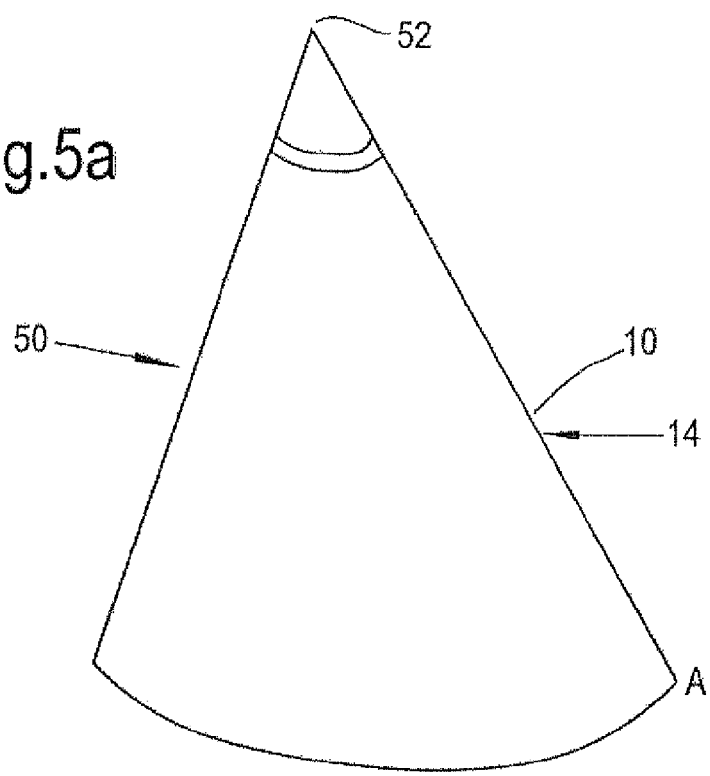
FIG. 5a shows the nose cone, with the area of test impact is along the line from the tip to point A.

FIGS. 5a, b and c show an alternative embodiment of the invention, in which an indicator is mounted on a nose cone.

FIG. 5a shows a nose cone 50, prior to a test impact designed to simulate the impact in service of a large soft body, such as a Canada goose. An indication element 10, comprising a releasable patch, is mounted on the surface of the nose cone 50. As explained above, the outer surface 14 of the indication element 10 is the same colour as the rest of the nose cone 50 and is thus not visually distinguishable from it. The test impact will occur at a point on a line from the nose cone tip 52 to the point A.

Figure 5B:
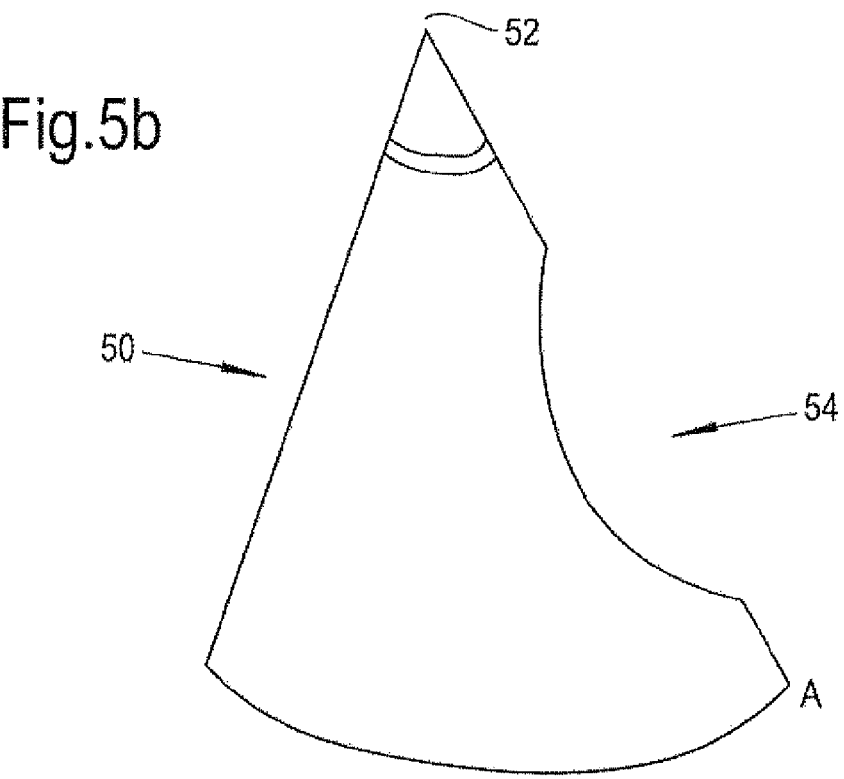
FIG. 5b shows the nose cone's deformation under simulated impact of a large soft body object (such as a Canada Goose)

In FIG. 5b, during the test impact, an impacting body (not shown) has struck the nose cone, causing elastic deformation 54 and therefore increased strain in the region of the nose cone where the indicator 10 is mounted.

Figure 5C:
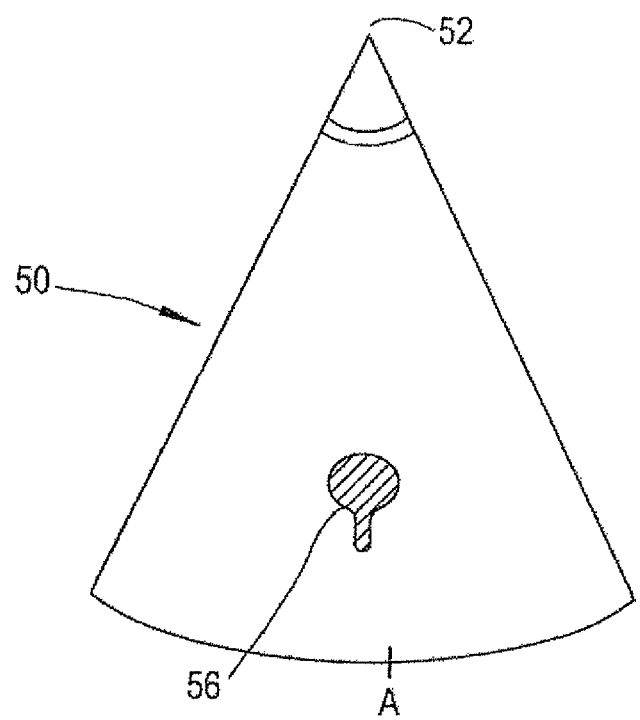
FIG. 5c shows the nose cone rotated, and the indicator patch has been released as a result of the impact.

In FIG. 5c, after the test impact, the nose cone 50 has been rotated through 90° about a vertical axis, so that the point A faces the viewer. Following the impact, the elastic deformation 54 has been removed returning the nose cone to its normal shape. There is therefore no visible damage to the nose cone that would indicate that its properties have been adversely affected. However, because the strain in the impacted region of the nose cone exceeded the predetermined strain threshold during the impact, the indicator 10 has transitioned from the rest state to the indication state and the patch has been released. The blade surface 56, previously hidden beneath the patch, is therefore revealed and provides a visual indication that the strain threshold has been exceeded. This indicates that there may be damage within the nose cone, and the appropriate action can be taken. Subsequent inspection may show that no internal damage has occurred, in which case the component can be reworked and placed back in service.

In FIG. 5c, it will be observed that the patch has a distinctive shape. This allows the release of a patch to be easily recognised as such and differentiated from, for example, ingestion of coloured debris that may leave a coloured mark on the nose cone.

The present invention provides a visual indication of conditions that may result in substantially non-visible damage to a component of a gas turbine engine. The invention thus ensures reliable early detection of bird strike and other impacts resulting in non-visible damage. In doing so, the invention ensures that any component of a gas turbine engine, and in particular critical components such as fan blades, can be designed to be damage tolerant without being over-designed. This improves the engine's performance, while indicating when more extensive inspections are required to ensure safe and reliable use.

The invention claimed is:

1. A component for use in a gas turbine engine, the component comprising an indicator operable to provide a visual indication when strain over a threshold value has been experienced by the component by transitioning from a rest state to an indication state on occurrence of strain above the threshold value,
wherein:
the indicator includes an indication element and a fixation element that mounts the indication element to a surface of the component, and
the transition of the indicator from the rest state to the indication state comprises failure of at least one of the indication element and the fixation element.

2. A component as claimed in claim 1, wherein the visual indication comprises a change in colour of the indicator between the rest and indication states.

3. A component as claimed in claim 1, wherein the indicator is operable to transition through a plurality of indication states on occurrence of strain over successive threshold values.

4. A component as claimed in claim 1, wherein the indication element comprises a patch of frangible material.

5. A component as claimed in claim 4, wherein the frangible material comprises a colour that is indicative of the indication state.

6. A component as claimed in claim 4, wherein the patch of frangible material houses at least one frangible container which holds a dye of a colour that is indicative of the indication state.

7. A component as claimed in claim 4, wherein an outer surface of the indication element-comprises a coating of a colour that is indicative of the rest state.

8. A component as claimed in claim 1, wherein the fixation element comprises a frangible adhesive.

9. A component as claimed in claim 8, wherein the frangible adhesive comprises a colour that is indicative of the indication state.

10. A component as claimed in claim 1, wherein the fixation element comprises a frangible mechanical fastening.

11. A component as claimed in claim 10, wherein the indication element comprises a colour that is indicative of the rest state.

12. A component as claimed in claim 11, wherein a region of the component that is covered by the indication element comprises a colour that is indicative of the indication state.

13. A component as claimed in claim 1, wherein the fixation element comprises a housing formed within the blade.

14. A component as claimed in claim 13, wherein the housing is operable to release the indication element on experiencing strain above the threshold value.

15. A component as claimed in claim 1, wherein the indicator is located at a region of the component that is subject to strain over the threshold value during an impact event.

16. A component as claimed in claim 1, wherein the component is made of composite material.

17. A component as claimed in claim 1, wherein the component is a blade or stationary vane or nose cone or intake nacelle.

18. A gas turbine engine including a component as claimed in claim 1.

19. A method of detecting foreign object damage in a component of a gas turbine engine, comprising:
identifying at least one of a component or a region of a component that is subject to increased strain during a foreign object impact; and
mounting an indicator on the identified component or region of a component, the indicator providing a visual indication when increased strain has been experienced,
wherein:
the indicator includes an indication element and a fixation element that mounts the indication element to a surface of the component, and
the transition of the indicator from the rest state to the indication state comprises failure of at least one of the indication element and the fixation element.

* * * * *